March 23, 1965 K. E. SCHREINER 3,175,164

NON-LINEAR RESONANT APPARATUS

Filed June 30, 1958 3 Sheets-Sheet 1

3,175,164

NON-LINEAR RESONANT APPARATUS

Kenneth E. Schreiner, Harrington Park, N.J., assignor to International Business Machines Corporation, New York, N.Y., a corporation of New York Filed June 30, 1958, Ser. No. 745,573
37 Claims. (Cl. 330—4.9)

This invention relates to non-linear resonant apparatus, and methods of operating same, and more particularly to multi-stable systems having a plurality of preferred phases.

This application is a continuation-in-part of my application Serial No. 671,862, filed July 15, 1957, now Patent No. 3,000,564.

Illustrative embodiments of the invention are disclosed which are particularly adapted for use, with important advantages, in amplifiers, oscillators, memory systems, shift registers, logic systems, signal retimers and reshapers, etc. While the forms illustrated are especially appropriate in information handling, computing and the like, the invention, in its broadest aspects, is not limited to those fields.

In the field of information handling and computing generally, it is advantageous to have reliable sources of alternating waves of two or more stable phases, to be able to amplify such waves, to switch readily from one stable phase to another, and to employ sustained waves of stable phase as records of items of information over longer or shorter intervals of time. These are among the objects to which the invention is directed.

In a typical illustrative embodiment, a wave supporting structure is provided to which is coupled non-linear impedance means, for example, one or more semiconductor diodes. A length of coaxial cable is an illustrative wave supporting structure which may be used for this purpose. The system comprising, in combination, the wave supporting structure and the non-linear impedance means is arranged so that the combination is resonant or nearly resonant to at least one frequency, say $f_1$. That is, neither the non-linear impedance means nor the wave supporting structure alone is resonant in the neighborhood of the frequency $f_1$, but the combination of the two is so resonant. The wave supporting structure considered along constitutes predominantly a reactance at the frequency $f_1$, which reactance is resonated with the reactance of the non-linear impedance means. The coupling between the non-linear means and the structure is effective for waves including waves of the frequency $f_1$. An energizing wave at a frequency $f_2$ materially different from frequency $f_1$ is also impressed upon the system. The frequency $f_2$ will sometimes be referred to as the excitation frequency. In the apparatus described, the wave of frequency $f_2$ in the presence of the non-linear means will operate to sustain a wave component of frequency $f_1$. In addition, coupling elements are connected to the structure for use in picking up from the system or impressing upon it, waves of a resonant frequency of the system. This resonant frequency may be either the frequency $f_1$ or some other frequency.

In a preferred embodiment of the invention the non-linear impedance means is substantially a non-linear reactance element. In general, the non-linear means will be referred to herein as a non-linear reactance means or as a non-linear reactor, and may, for example, comprise a non-linear capacitance or a non-linear inductance. If the non-linear means is a capacitance, the wave supporting structure is appropriately proportioned to serve as an inductance at one or more of the frequencies to be accommodated in the system as a whole. If, on the other hand, the non-linear means is an inductance, the wave supporting structure should be proportioned to serve as a capacitance at the said frequency or frequencies.

Devices of the general type described herein are sometimes called parametric devices, for example parametric amplifiers.

In one embodiment, the excitation frequency $f_2$ is an integral multiple of the frequency $f_1$, for example $2f_1$ in a preferred embodiment. By intermodulation of waves of frequency $f_2$ and waves of frequency $f_1$, a component of frequency $f_1$ is regenerated in the non-linear reactance means, for sustaining an initial wave component of frequency $f_1$. The resulting wave of frequency $f_1$ will be in one or another of a plurality of stable phases which may be supported by the wave of the excitation frequency. While an exact frequency ratio and phase relationship is necessary between the waves of frequency $f_1$ and $f_2$ respectively, the resonant frequencies of the system need only be approximate.

The initial wave component of frequency $f_1$ may be either a spontaneously generated wave due to thermal activity, circuit noise, etc., or, on the other hand, a desired initial wave may be impressed upon the system by external means. The phase of the wave of frequency $f_1$ which is sustained at a given point in the system may be controlled by controlling the phase of a wave of that frequency impressed on the system. Also, the amplitude of an impressed wave may be made sufficient to over-ride the effect of waves of undesired phase of whatever origin.

In another embodiment, the excitation frequency $f_2$ may be unrelated to the frequency $f_1$, in which case impressed oscillations of the frequency $f_2$ in the presence of an initial wave component of frequency $f_1$ tend to generate oscillations of some third frequency $f_3$. The oscillations of the frequency $f_3$ may then be used as an input to a second device of the same kind, in which an exciting wave of the frequency $f_2$ may be combined with the wave of the frequency $f_3$ to generate a wave of the frequency $f_1$. The newly-generated wave of frequency $f_1$ may be impressed upon the first device to sustain waves of the frequency $f_1$ in the first device.

A system embodying the invention may be a unitary device used alone, or two or more such devices may be combined or interconnected to form more complicated systems.

A system in accordance with the invention may provide a source of a plurality of waves of a given frequency in a controlled and stable phase relationship to one another. The phases of these waves may in turn be controlled in definite relationship to the phase of a wave impressed upon the system from outside, for example, from another similar system in accordance with the invention.

The systems contemplated are multi-stable and may be switched from one stable phase condition to another as by application of an impressed wave of proper phase. Information may be stored in such a system and subsequently "read out" into another system of similar or even different type.

A system in accordance with the invention may be adjusted to repeat or to amplify an impressed wave, with any desired degree of regenerative effect, or the system may be made self-oscillatory and used as an oscillator. By means of synchronization or gating to start or stop oscillations, an impressed signal which may be imperfect may be reshaped or retimed.

A plurality of unitary systems may be combined with coupling between units, so as to form, for example, a shift register or a circulating memory system.

Basically, the system used in practicing the invention comprises reactances L and C arranged in series, parallel, or other combinations, in which at least one of the reactances is non-linear, i.e., the inductance value of L or the capacitance value of C is a non-linear function of the potential impressed upon the reactance element or of the current flowing to or from the element. With particular advantages at higher frequencies, non-linear resonant circuits may, as illustrated in several embodiments herein, employ resonance configurations of waves in a wave guiding structure.

In a preferred embodiment of the invention, a high frequency transmission line, for example a length of coaxial cable or stripline, serves as the wave guiding structure, and is energized at an intermediate point and terminated at one end or at both ends by an element or elements the capacitance of which varies with the electric field strength, such as a reverse-biased semiconductor diode of the silicon or germanium type. Other devices which may be used as non-linear reactances may be constructed from other materials such as ferromagnetic or ferroelectric materials. The waves supported in the length of transmission line are in the TEM mode. This transmission line portion of the system will sometimes be referred to as a line segment. An output signal may be obtained from the apparatus by a coupling element connected to the transmission line.

Among the features and advantages of the invention in various embodiments are the following:

The system may be given an inherent balanced, e.g., push-pull, type of action which produces a desirable balancing effect upon the output signals.

Multiple phases are available in the output without the need for additional converting means. For example, in a two-phase system, both phases are available without an inverter. This property is desirable in connection with logical operations, for example.

The system may be arranged to have an intermediate point that is at low impedance at the resonant frequency. Hence, the resonance is not materially affected by loading as by the application of exciting oscillations at this point. With proper tuning, the load on the source of the excitation can be made purely resistive, thus providing maximum power transfer.

Where biased diodes are used as the non-linear reactance means, the biasing circuit may be balanced with respect to the wave supporting structure so that resonance conditions are not materially disturbed by the presence of the biasing means. Self-biasing can be used for certain types of bistable operation. Also, switching pulses may be impressed upon the system through the biasing circuit. In addition, non-linear resistance characteristics accompanying the non-linear reactance of devices such as biased diodes are useful in improving the rise time and in limiting the oscillations at resonance, particularly in applications in bi-stable or multi-stable devices.

Other objects, features and advantages will appear from the following more detailed description of an illustrative embodiment of the invention, which will now be given in conjunction with the accompanying drawings.

In the drawings:

FIG. 1 is a perspective view, partly broken away and partly diagrammatic, of a system embodying the invention in a coaxial cable structure;

FIG. 1–A is a graph showing illustrative standing wave forms for the system of FIG. 1;

FIG. 1–B is a fragmentary view of a modified portion of FIG. 1 showing a self-biasing arrangement;

FIG. 2 is a schematic representation, somewhat simplified for clarity, corresponding to the system shown in FIG. 1;

FIGS. 3, 4 and 5 are schematic representations of particular embodiments of the invention, which are modifications of the system of FIGS. 1 and 2, of which FIG. 3 shows an oscillator, FIG. 4 shows a form adaptable for use as an oscillator or as an amplifier, and FIG. 5 shows a system like that of FIG. 4, but having a circulator for separating input and output waves;

FIG. 6 is a schematic representation of a system employing waves of three different frequencies;

FIG. 7 is a schematic representation of a modification of the system of FIG. 6 for use as an amplifier;

FIG. 8 is a schematic representation of a shift register or of a circulatory transmission system comprising a plurality of unitary devices of the general type shown in FIGS. 1–2;

FIG. 9 is a schematic diagram of an unidirectional coupling arrangement for use between adjacent unitary devices in a system of the type shown in FIG. 8.

Figures 1, 1A, 1B:
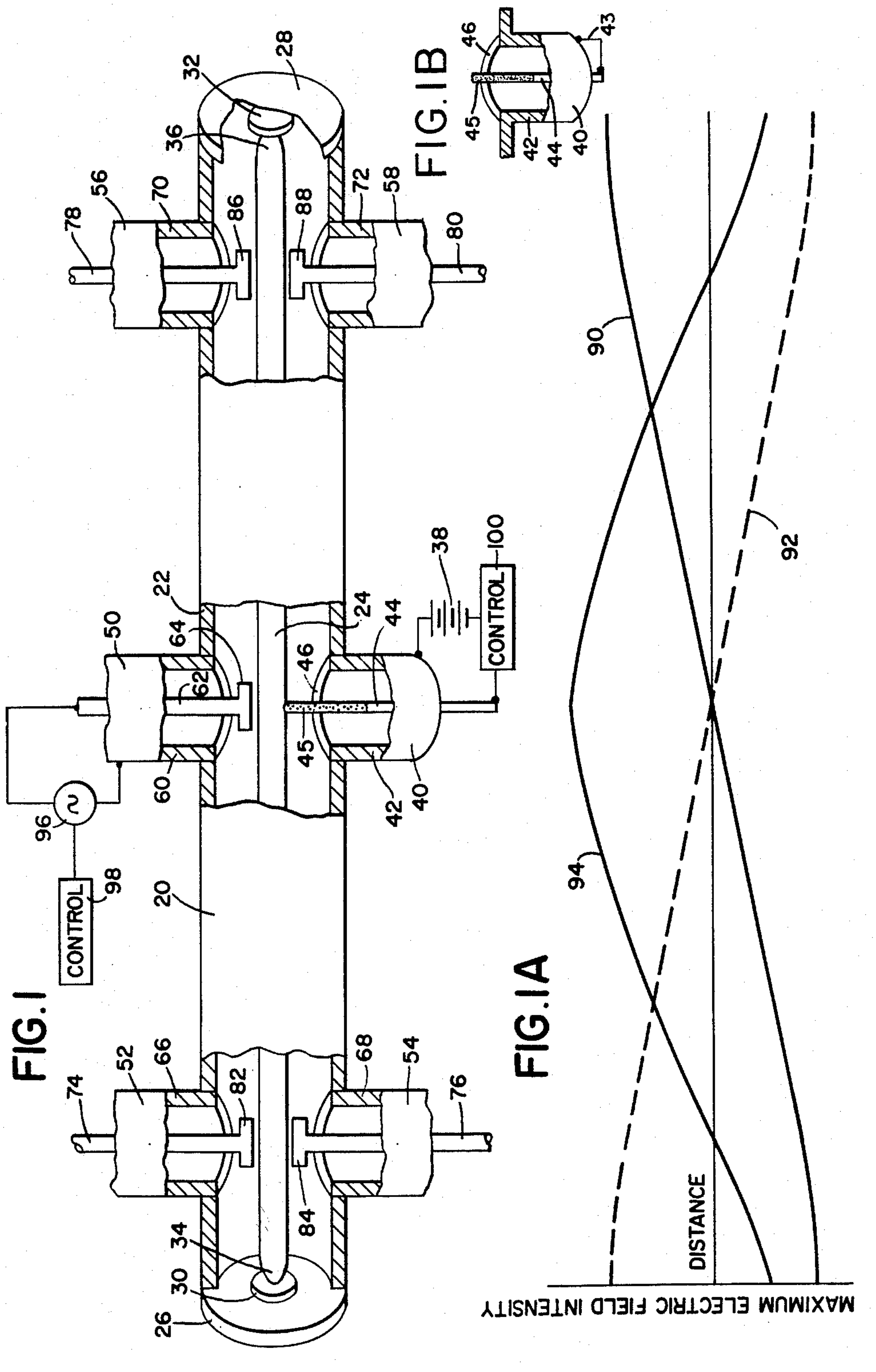

FIG. 1 shows a length 20 of coaxial cable comprising an outer cylindrical conductive sheath 22 and a coaxial inner conductor 24. The cable 20 is terminated at the ends by conductive end plates 26, 28 to which are conductively connected non-linear reactance means such as diodes 30 and 32, respectively. The ends of the inner conductor 24 are conductively connected to the respective diodes as by means of resilient end portions 34, 36, each end portion being pressed against a small contact area on the surface of the respective diode.

For biasing the diodes 30, 32, there is provided biasing voltage means such as a battery 38 and a coaxial cable 40. The terminals of the battery are connected respectively to the outer conductor 42 and inner conductor 44 of the cable. The cable 40 has the open end of its outer conductor 42 remote from battery 38 fitted into a hole in the outer conductor 22 of the main cable 20, so that conductor 42 is conductively connected to conductor 22 and thence to one side of each of the diodes 30 and 32. In order to make a conductive connection from conductor 44 to the inner conductor 24 of the main cable and thence to the other side of each of the diodes to complete the biasing circuit without at the same time short-circuiting the conductor 24 to ground for alternating waves, the conductor 44 may be terminated short of the entrance to the cable 20 and an extension may be attached thereto in the form of a rod 45 of dielectric material which abuts the conductor 24. The surface of the rod 45 may have deposited thereon a film or coating of resistive material making contact both with the conductor 44 and with the conductor 24 and constituting a relatively high resistive path therebetween. Alternative arrangements for biasing the diodes without short-circuiting the main cable for alternating waves will readily be devised by those skilled in the art.

Self bias of the diodes may be provided by increasing the resistance of the rod 45 beyond that required to avoid short-circuiting the line 20, and connecting the inner conductor 44 of cable 40 to the sheath 42, by a connection 43 as shown in FIG. 1–B. Battery 38 and control 100 then are not needed. The diodes will charge the capacitances which exist between the inner and outer conductors of the line 20 while the resistance of the rod 45 will govern the rate of discharge.

When self bias is used, amplitude stability develops in addition to the phase stability already noted.

Also, if desired, the self-biased system can be made to exhibit two stable amplitude conditions. If the system is in one of its stable amplitude conditions, and the amplitude of the excitation is changed momentarily, it is possible to make the system shift abruptly over to a frequency on the other side of the resonance curve where a stable amplitude of a different value is again reached.

A plurality of high frequency couplings to the cable 20 are provided in the form of coaxial cable connections 50, 52, 54, 56, 58. Illustrative of these is the cable 50 which comprises an outer conductor 60 with an open end fitted into a hole in the outer conductor 22 of the main cable 20, and an inner conductor 62. The inner conductor extends into the interior of the cable 20 and terminates in spaced juxtaposition to the inner conductor 24 of the main cable to provide capacitive coupling between the conductors 24 and 62. If desired, the conductor 62 may have an enlarged end portion 64 for increased coupling capacitance. The member 64 may be integral with or conductively attached to the conductor 62. The cables 52, 54, 56 and 58 comprise outer conductors 66, 68, 70 and 72, respectively, inner conductors 74, 76, 78 and 80, respectively, and the latter may have enlarged end portions 82, 84, 86 and 88, respectively. It is generally desirable that the linear capacitive couplings above described be localized to couple substantially at a single point, so that a coupling for waves of one frequency may be effected within a nodal region for waves of another frequency for purposes which will be apparent hereinafter. One or more of the coupling cables 52, 54, 56, 58 may be omitted as desired according to the number of couplings which are needed in any given application of the invention.

In the system of FIG. 1, the diodes 30 and 32 constitute lumped non-linear elements providing the capacitance C of the basic system. The inductance L is provided by the wave guiding structure shown here as coaxial cable 20. The cable 20 is shown terminated at each end by a diode. The half-length of the cable 20 will be designated by $l$. A typical value for $l$ is one-eighth of a wavelength, that is, $$l=\lambda/8$$

where $\lambda$ is the wavelength. Values of $l$ in a range from say one-sixteenth to three-sixteenths wavelength may also be used.

If greater physical length is not undesirable, any number of half wavelengths may be added to the full length of the cable. Thus suitable values for the full length of the cable 20 include a quarter wavelength, three-quarters wavelength, five-quarters wavelength, and other odd numbers of quarter wavelengths.

Values of the half-length $l$ of the cable which give capacitive reactance do not typically produce resonance with the capacitance C. If $l$ is close to a quarter wavelength or multiple thereof, the capacitance required for resonance may be too large or too small for practical use.

The wavelength $\lambda$ which has been referred to above is the wavelength of waves at the frequency to which the system is resonant. In an embodiment about to be described, it is the wavelength at the frequency which will be designated as $f_1$.

The system of FIG. 1 will be considered to represent a transmission line the full length $2l$ of which is $\lambda/4$. To analyze the system from the standpoint of the resonant frequency, it is permissible and convenient to consider the transmission line consisting of the main cable 20 in FIG. 1 initially as divided into two parts by means of a short circuit across the center, that is, at the plane perpendicular to the conductor 24 through the point where the biasing rod 45 is connected to the conductor 24. Then each diode 30, 32 is in parallel relationship to a transmission line of length $\lambda/8$ short-circuited at the end of the line remote from the position of the diode. According to known transmission line theory, the impedance looking into the short-circuited line from the location of the diode is $jZ_0 \tan 2\pi l/\lambda$, where $Z_0$ is the characteristic impedance of the transmission line, and $j$ indicates that the impedance is a pure reactance. For the line of length $\lambda/8$ the value of the impedance is simply $jZ_0$.

The capacitance C of the diode may be represented by $$C=C_0+\Delta C$$

where $C_0$ is the mean value of the capacitance and $\Delta C$ is the variation of the capacitance. The value of $C_0$ necessary to resonate with the short-circuited line of length $\lambda/8$ is given by the known resonance formula $$\sqrt{LC_0}=\tfrac{1}{2}\pi f$$

where L is the inductance of the line. When so resonated by the capacitance of the diode, the line has a voltage node at the short-circuited end. Hence two such resonated lines may be placed with their short-circuited ends together and then, since a voltage node exists where the short circuit is located, the short circuit may be removed, giving as a result the configuration of the system shown in FIG. 1. The waves at the two ends of the line differ in phase by 180 degrees and the voltage node at the mid-point is, therefore, a point of low impedance at the resonant frequency. In the graphs shown in FIG. 1–A, the solid line 90 represents the distribution of maximum electric field intensity along the length of the cable 20 for one of the two stable phases for waves of the resonant frequency $f_1$. The other phase is represented by the dotted line 92. It will be noted that the diodes are located in regions of relatively high electric field intensity for the frequency $f_1$.

In accordance with the invention, the diodes are subjected not only to a wave of frequency $f_1$, as just shown, but also to a wave of another frequency $f_2$. It is desired that the wave of frequency $f_2$ have the least possible disturbing or loading effect upon the waves and resonant circuit of frequency $f_1$. This result may be achieved by impressing the waves of frequency $f_2$ upon the system at the nodal point for frequency $f_1$, as by means of the coupling cable 50.

In many cases of particular interest the frequency $f_2$ is greater than the frequency $f_1$. Then, the reactance of the diode is less at $f_2$ than at $f_1$ and therefore at $f_2$ a voltage node will be present at some point on the line 20 between the diode and the voltage node for $f_1$. In FIG. 1, the coupling lines 52 and 54 are shown coupled to the line 20 at a voltage node for $f_2$ intermediate between the diode 30 and the voltage node for $f_1$. Also, the coupling lines 56 and 58 are shown coupled to the line 20 at a voltage node for $f_2$ intermediate between the diode 32 and the voltage node for $f_1$. In the graph of FIG. 1–A, the line 94 with an angular discontinuity at the center represents the distribution of maximum electric field intensity along the line 20 for standing waves of frequency $f_2$. The exciting or energizing wave of frequency $f_2$ may be impressed upon the line 20 through the coupling cable 50. The impedance at the frequency $f_2$ looking into the coupling line 50 will in general be reactive but this reactance may be neutralized, i.e., tuned out, as by means of a tuning reactor which in the case of an inductive reactance to be tuned out will be a capacitance. In the system of FIG. 1, the tuning for frequency $f_2$ is preferably accomplished by the capacitance between the conductive members 64 and 24 by which the cable 50 is coupled to the main cable 20. A source of waves of frequency $f_2$, as represented by a generator 96 in FIG. 1, may then be connected to the cable 50 as shown, with the result that the generator will work into a substantially pure resistive load. The standing wave pattern of the type represented at 94 in the graph of FIG. 1–A will then appear on the line 20 at frequency $f_2$. The oscillator 96 may be controlled if desired as by control means 98, or the oscillator may operate continuously.

In case the diodes 30, 32 require biasing either to adjust them to the proper mean value of capacitance or to achieve fine tuning of the system, or for any other reason, the biasing is conveniently and efficiently done by means of the coupling cable 40 and biasing source 38. A reverse bias is generally preferable to a forward bias as providing a variable capacitance and a minimum of resistance variation.

A control device 100 may be inserted in the biasing circuit to apply to a pulse type of input to the system through the biasing circuit or for any other desired control purpose. The control devices 98 and 100 may be employed for switching or other purposes.

The operation of the system of FIG. 1, either as a unitary apparatus or as a component part of a more complicated system may be more readily understood with reference to diagrammatic representations of systems adapted to particular uses as shown in FIGS. 2–9.

Figures 2, 3, 4, 5, 6, 7, 8, 9:
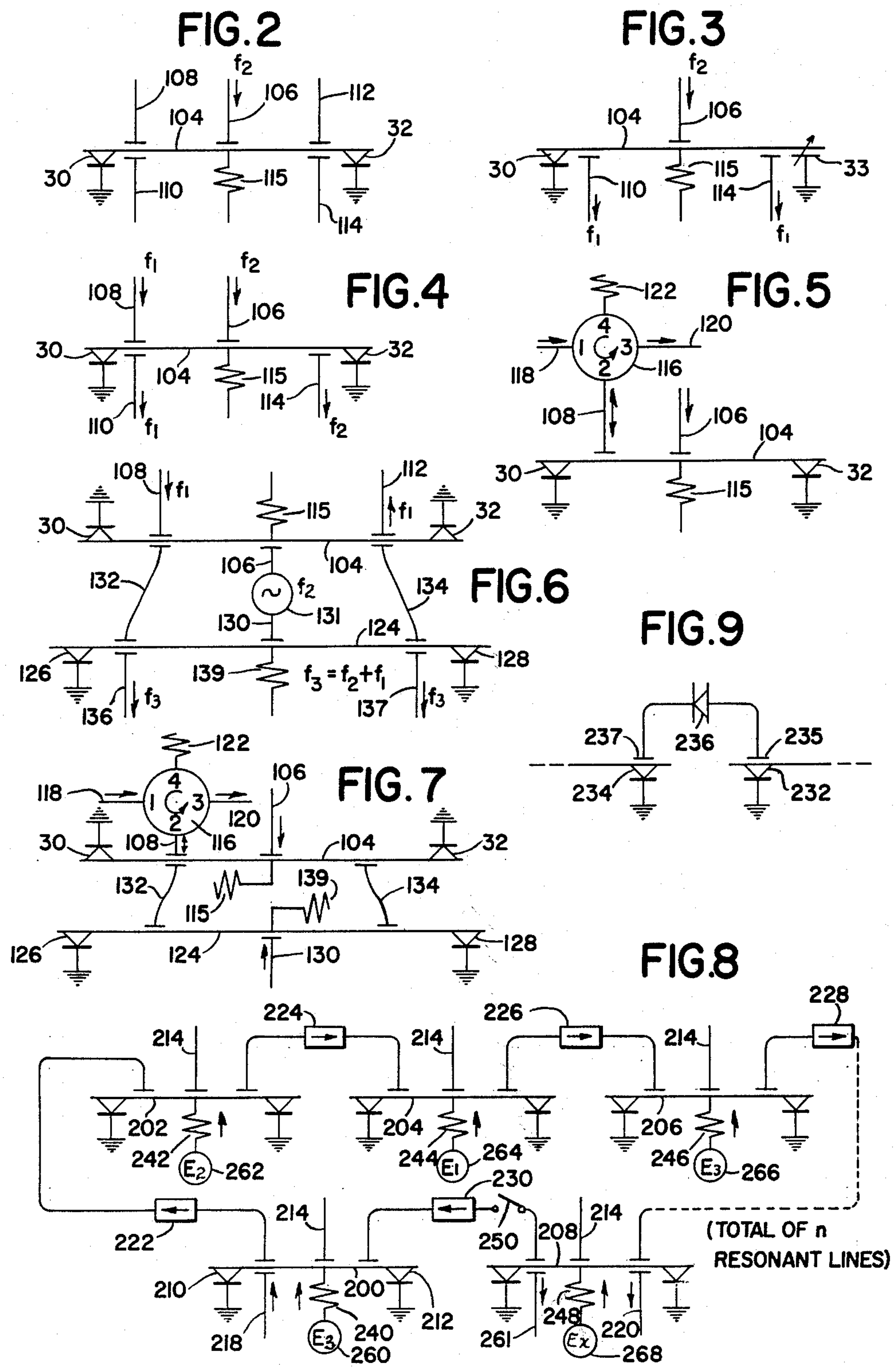

FIG. 2 shows the apparatus of FIG. 1 in schematic representation. The transmission line 20 of FIG. 1 is represented by a horizontal single line 104 at the ends of which the diodes 30, 32 are shown schematically as being connected between the grounded and ungrounded sides of the line. The energizing circuit for impressing the input wave at frequency $f_2$ is shown schematically at 106 with an arrow directed toward the line 20 to indicate an input coupling. The coupling lines 52, 54, 56, 58 of FIG. 1 are represented schematically at 108, 110, 112, 114 respectively, without arrows, to indicate that these coupling connections may be used either as inputs or as outputs, as needed. The biasing connection is represented schematically by means of a resistor 115.

Using schematic representations of the type shown in FIG. 2, various modifications and elaborations of the type of system shown in FIG. 1 may now be described without need for perspective or other mechanical drawings.

FIG. 3 shows an adaptation of the system of FIGS. 1–2 as an oscillator which may provide waves of two different phases in its output. Comparing FIGS. 2 and 3 it will be noted that the coupling lines 108 and 112 of FIG. 2 are omitted in FIG. 3 and that the coupling lines 110 and 114 of FIG. 3 have arrows to indicate that these coupling lines are used as output lines. Also the diode 32 of FIG. 2 is replaced in FIG. 3 by a linear capacitance termination 33 having a capacitance value preferably equal to the mean value $C_0$ of the capacitance of the diode 30. The element 33 may be made variable for use as a mechanical tuning device.

In the operation of the system of FIG. 3, the diode 30 is energized at the frequency $f_2$ by means of an input wave impressed upon the system by means of the input coupling 106 at that frequency. The resonance of the system at frequency $f_1$ is not materially different when a single diode is provided at one end of the line and a linear capacitance at the other end than it is when diodes are provided at both ends. The frequency $f_2$ should be an integral multiple of the frequency $f_1$. For input voltages of frequency $f_2$ below a certain threshold value for the system there will be no output wave at the frequency $f_1$ to which the system is resonant. This is because until the threshold value is exceeded there is insufficient regenerative effect present in the system to sustain oscillations and any wave component of frequency $f_1$ which may be present in the system due to thermal agitation, noise currents, etc., will be damped out by the resistive impedances in the system. When the threshold is exceeded, however, the system becomes oscillatory and the wave components of frequency $f_1$ which are always present are built up and become self-sustaining. An output wave of frequency $f_1$ is therefore produced. Since the coupling lines 110 and 114 are effectively coupled to the line for frequency $f_1$, output waves are delivered to both of these lines. As indicated by the wave forms 90, 92 in FIG. 1–A, the output waves at 110 and 114 are opposite in phase. Both of these phases are thus available, without the need for a separate phase inverter to convert waves of one phase into waves of the other phase. Whether the phase in line 110 is relatively as represented by curve 90 or as represented by curve 92 will depend upon whatever random phase may be present in the line 104 when oscillation sets in.

FIG. 4 shows an adaptation of the system of FIGS. 1–2 which may be used either as an oscillator or as an amplifier according to how the system is adjusted. A comparison of FIGS. 2 and 4 shows that the coupling line 112 of FIG. 2 is omitted in FIG. 4. The comparison also shows that the coupling 108 has an arrow to indicate that it is used as an input and couplings 110 and 114 have arrows to indicate that they are used as outputs.

In the operation of the system of FIG. 4 as an oscillator, the input at 106 is adjusted to exceed the threshold value for oscillation. The input coupling 108 is employed to impress upon the system an input wave of frequency $f_1$ and of a particular phase which it is desired to impress upon the system. The output at 110 will have its phase determined by the phase of the input at 108 and the output at 114 will be of opposite phase to the output at 110. Once the system has set up the desired phases, the system will be in a stable phase state and thereafter the input at 108 may be removed and the system will continue to supply the two outputs in the phases as originally determined by the input at 108.

In the operation of the system of FIG. 4 as an amplifier, the input at 106 is adjusted to a value which does not exceed the threshold value, and preferably to a value below the threshold by a material amount. The coupling 108 may then be used as an input coupling for a wave of frequency $f_1$ to be amplified. The system acts as a stable amplifier, giving a replica of the input wave at 110 and a similar wave of opposite phase at 114. The system becomes a regenerative amplifier when the input at 106 approaches relatively close to the threshold value, the amount of regenerative effect increasing the more closely the input wave approximates the threshold value. Instability develops at or near the threshold value. Accordingly, for stable operation an adjustment providing a suitable separation between the operating value and the threshold value should be used. In general, the power output at either 110 or 114 will be greater than the power input at 108.

Some output power is likely to flow in coupling line 108 back toward the source of the wave to be amplified. If this power is not to be lost, a circulator of, for example, the ferrite type may be used. If it is desired only to prevent the source from being effected by the power fed back, then an isolator of, for example, the ferrite type may be used.

FIG. 5 shows a system like that of FIG. 4 but having a circulator connected to the input coupling line 108. The circulator is shown schematically at 116 and has terminals 1, 2, 3 and 4. The property of the circulator is such that a wave impressed upon terminal 1 is transmitted only to terminal 2, a wave impressed upon terminal 2 is transmitted only to terminal 3, a wave impressed upon terminal 3 is transmitted only to terminal 4, and a wave impressed upon terminal 4 is transmitted only to terminal 1. In the circuit of FIG. 5, the terminal 1 of the circulator 116 is connected to an input line 118 for the input of the wave to be amplified, the terminal 2 is connected to the coupling line 108, the terminal 3 is connected to an output line 120 for the amplified wave of frequency $f_1$, and the terminal 4 is connected to a resistive load or substantially reflectionless termination.

In the operation of the system of FIG. 5, the wave to be amplified is impressed by way of the line 118 upon terminal 1 of the circulator 116. The input wave is thus transmitted only through terminal 2 of the circulator to the coupling line 108. This line serves as both an input line and an output line, as indicated by a double headed arrow in FIG. 5. The output wave from line 108 is transmitted from terminal 2 of the circulator only to the output line 120, by way of terminal 3 of the circulator. If any wave enters the terminal 3 of the circulator from outside, as for example by reflection in line 120, the wave is transmitted only to terminal 4 and thence to the reflectionless termination 122 wherein it is absorbed.

FIG. 6 shows an arrangement involving waves of three distinct frequencies, thereby obviating the need for maintaining a precise relationship between the resonant frequency $f_1$ and the excitation frequency $f_2$. Instead of a single resonant system resonant to $f_1$ there is employed in addition a second resonant system for a frequency $f_3$. The only relationship required among the three frequencies is $$f_3=f_2-f_1$$

The upper portion of the system of FIG. 6 is generally similar to the system of FIG. 4. The line 104 in FIG. 6 is resonant to the frequency $f_1$. A second line 124 is provided which is resonant to $f_3$ and terminates in diodes 126 and 128 at either end. Both lines are excited by the same excitation frequency $f_2$, which is impressed upon line 104 by means of a coupling 106 and is impressed upon line 124 by means of a coupling 130. Couplings 106 and 130 are preferably driven as from a common source 131. Coupling lines 132 and 134 are provided which loosely couple the lines 104 and 124 with a coupling which is substantially linear and is effective in either direction and will transmit frequencies $f_1$ and $f_3$. Coupling 108 is provided as an input coupling for frequency $f_1$ into line 104. Coupling 112 serves as an output coupling for frequency $f_1$ from line 104, whereas couplings 136 and 137 are provided as output couplings for frequency $f_3$ from line 124. The coupling line 132 is preferably an extension of the coupling line 110 of FIG. 2 to couple with the line 124 at substantially the same point as coupling 136. Similarly the coupling line 134 is preferably an extension of the coupling 114 of FIG. 2 to couple with the line 124 at substantially the same point as coupling 137. Biasing resistor 115 is provided for line 104 and a similar biasing resistor 139 is provided for line 124.

In the operation of the system of FIG. 6 the frequencies $f_1$, $f_2$ and $f_3$ may all be unrelated except for the relationship $$f_3 = f_2 - f_1$$

which does not involve any particular frequency ratios and does not require any particular phase relationships.. The line 104 is excited by a wave of frequency $f_2$ applied by way of the coupling 106 whereby the line is maintained in oscillation at frequency $f_1$. An output of frequency $f_1$ is made available as in the coupling 112. Waves of the two frequencies $f_1$ and $f_2$ are both impressed upon the diodes 30 and 32 and are intermodulated in the diodes to produce a wave component of frequency $$f_3 = f_2 - f_1$$

which passes through the coupling lines 132 and 134 to the line 124 and serves to energize that line at the frequency $f_3$. Waves of the two frequencies $f_2$ and $f_3$ are impressed upon the diodes 126 and 128 and are intermodulated in those diodes to produce a wave component of frequency $$f_1 = f_2 - f_3$$

which passes back through the coupling lines 132 and 134 to the line 104. The system of FIG. 6 may be operated above the threshold value of excitation so as to produce oscillations at both frequencies $f_1$ and $f_3$, making either or both of these frequencies available as output waves at 112 and 136 respectively, or at 112 and 137 respectively. The system may also be operated as an amplifier, or as an amplifying converter, as for example by applying a wave of frequency $f_1$ at 108 which will appear amplified at 112 or as an amplified wave of frequency $f_3$ at 136 and 137.

FIG. 7 shows a modification of the system of FIG. 6 particularly adapted for use as an amplifier. The output couplings 112, 136 and 137 of FIG. 6 are omitted in FIG. 7. The coupling 108 serves both for input and for output and is associated with the circulator 116 and circuits connected thereto as in FIG. 5.

The system of FIG. 7, as shown, is arranged to amplify at the frequency $f_1$. The input wave at this frequency is fed into the coupling line 118 and thence into terminal 1 of the circulator. As in the arrangement of FIG. 5, the circulator delivers an input to coupling line 108 by way of terminal 2. The amplified output wave from line 104 is delivered over coupling line 108 into terminal 2 of the circulator and thence by way of terminal 3 to the output coupling line 120. Any wave returning to terminal 3 from line 120 is transmitted to the reflectionless termination 122 by way of terminal 4. The system is excited by means of waves of frequency $f_2$ impressed upon the input coupling lines 106 and 130. The waves of frequency $f_1$ and $f_2$ are combined in the diodes 30, 32 to produce a wave of frequency $f_3$ that is the difference of the frequencies $f_1$ and $f_2$. The wave of frequency $f_3$ is transmitted over the coupling lines 132, 134 to the line 124 where a resonant response is set up. Waves of frequency $f_2$ and $f_3$ are combined in the diodes 126, 128 to produce a wave of frequency $f_1$ which is transmitted back over the coupling lines 132, 134 to the line 104. This wave of frequency $f_1$ in line 104 constitutes the amplified output wave which is transmitted over the coupling 108 and thence by way of the circulator 116 to the output coupling line 120. It will be evident that the system may be modified so that an input wave of frequency $f_3$ is applied to line 124 and an amplified output wave obtained at that frequency.

FIG. 8 shows a system particularly adapted for use as a shift register or as a circulating memory system. A plurality of non-linear resonant line segments of the general type shown in FIG. 2 are provided with couplings linking adjacent line segments to form a delay device in which phase information is free to pass from segment to segment substantially in one direction only. In the figure, line segments 200, 202, 204, 206 and 208 are shown with an indication that others may be included. The typical individual line, for example line 200, is terminated in diodes 210 and 212, has an excitation input coupling 214 and a synchronizing input connection shown as a resistor 240 which also serves as a biasing connection. For purposes of "reading in" and "reading out" information stored in the system, an input coupling line 218 for line 200 and an output coupling line 220 for line 208 may be provided. Additional input and output coupling lines may be provided as desired of which there is shown an output coupling line 261 for line 208. Coupler 222 is provided from line 200 to line 202, coupler 224 from line 202 to line 204, coupler 226 from line 204 to line 206, coupler 228 from line 206 to the next adjacent line on the side of line 206 remote from line 204, and coupler 230 from line 208 to line 200. Switching or line terminating means 250 is shown whereby the coupler 230 may be rendered inoperative when the system of FIG. 8 is to be used as a shift register. When the coupler 230 is made operative by the means 250 to form a closed ring of coupled line segments the system may be used as a circulaing delay system e.g., as a circulating memory system. In either case, synchronizing sources 260, 262, 264, 266, 268 may be connected to the respective resistors 240, 242, 244, 246, 248. In the embodiment now to be described, the couplers 222, 224, 226, 228, 230 are unidirectional as indicated by arrows in FIG. 8.

In the operation of the system of FIG. 8 as a shift register, phase information impressed upon line 200 by means of a wave applied to input coupling line 218 will be passed through coupler 222 to line 202, thence through coupler 224 to line 204, etc., until it reaches line 208 where by means of output coupling 220 or 261 the information may be read out, or passed for example to an arithmetic unit of a digital computer. A succession of items of phase information may be impressed upon the coupling 218 in turn up to the carrying capacity of the system. The timing of the passage of information from line to line may be controlled by a suitable set of synchronizing waves. These may be applied to the biasing circuits of the respective lines as variations in bias voltage. Alternatively, the excitation of the respective lines may be controlled individually to effect the desired result.

Figure 10:
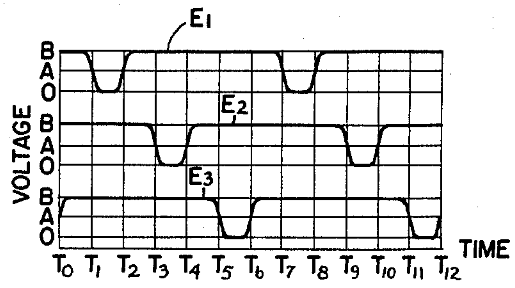
FIGS. 10, 11 and 12 are graphs showing various systems of control waves applicable to the system of FIG. 8.

FIG. 10 shows one scheme of synchronizing voltage biases which may be supplied by the sources 260, etc., for controlling the operation of the system of FIG. 8. FIG. 10 comprises three graphs of voltage plotted against time with the same time scale for the three graphs. Three voltage levels are shown for each graph, marked O, A and B, respectively. Level O represents a bias which detunes the diodes to such an extent that oscillation is substantially inhibited. Level A represents a bias which renders the diodes sufficiently close to the resonant condition so that oscillations may start to build up. Level B represents a bias which brings the diodes into substantially correct resonance for sustaining stables oscillations. Each of the graphs is at level O during about one-sixth of each cycle and at level B during the remainder of each cycle except for brief transition intervals when the voltage passes through the level A on the way from level O to level B or vice versa. The graphs show three phases of voltage waves, labelled $E_1$, $E_2$ and $E_3$, respectively, differing in phase by increments of one-third of a cycle. Source 260 supplies a voltage wave of the phase of $E_3$ to the line 200 through the resistor 240. Sources 262, 264 and 266 supply voltage waves of the phases $E_2$, $E_1$, $E_3$ to the lines 202, 204, 206, respectively, and source 268 supplies to line 208 a voltage wave of appropriate phase depending upon how many line segments are included in the system. The phase of source 268 will be designated $E_x$.

The manner in which the synchronizing waves of FIG. 10 operate to pass phase information from line segment to line segment in the system of FIG. 8 will now be described in detail. Each of the line segments 200, 202, 204, 206, etc., may represent an item of phase information by being in a state of oscillation in one or another of the stable phase conditions which the line segment is capable of assuming. In a binary system, each line segment has two stable phase conditions, one of which may be used to represent a binary digit "one" and the other a binary digit "zero", for example. Suppose that W, X, Y, Z denote a succession of items of phase information that is to be stored in the system of FIG. 8. Suppose, further, that at time $T_0$ on the time scale of FIG. 10 the state of the oscillations in the system is unknown but the synchronizing waves are in the relationship shown in FIG. 10, that is $E_3$ is passing through the critical level A on the why to oscillation level B. Now let an input wave of the phase represented by W be applied to input coupling 218 at time $T_0$. Assuming the excitation to be continuously applied to all the excitation input couplers 214, the line 200 will be set into sustained oscillations of the particular stable phase determined by the phase information item W. At time $T_1$, wave $E_1$ falls from level B through level A toward level O, thereby deturning line segment 204 and all other line segments that are dependent upon wave $E_1$ for tuning. At time $T_2$, the line segments served by $E_1$ return to the condition of sustained oscillations. Dut to the unidirectional nature of the coupling between adjacent line segments, a segment coming into the oscillating condition assumes the particular stable phase condition impressed upon it by the line segment on the side from which transmission can come via the unidirectional coupling and it is not influenced materially by the phase condition of the line segment adjacent on the other side. Whatever changes in phase condition may be effected by wave $E_1$ at time $T_2$ are not important at this point as the phase conditions in the part of the system affected remain unknown, but line 200 continutes to oscillate in phase W under the control of wave $E_3$. At time $T_3$, wave $E_2$ relinquishes control of the line segments to which it is connected and at time $T_4$, wave $E_2$ sets up oscillations in these segments each under the control of its neighbor on the side from which transmission is best received. Throughout this period line 200 continues to oscillate at phase W under the control of $E_3$, so line 202 receives phase information W from line 200 and goes into oscillation in the phase dictated by line 200. Line 204 is unable to affect the phase of line 202 because of the unidirectional nature of the coupling.

At time $T_5$, wave $E_3$ relinquishes control of line 200. Since a record of the phase information W has been set up in line segment 202 this information is no longer needed in line segment 200. So, at time $T_6$ an input wave of the phase represented by X may be applied to input coupler 218, thereby determining the phase of oscillations in line 200 to conform to phase information X. It is now known that information W is represented in line 202 and information X is represented in line 200.

At time $T_7$, wave $E_1$ relinquishes control, again affecting only the part of the system in which the phase conditions are still unknown. At time $T_8$, the $E_1$ wave sets up oscillations including oscillations in line 204 dictated by the phase information in line 202 irrespective of information in line 206. So information W is duplicated in line 204. Line 202 continues to oscillate in phase W and line 200 in phase X.

At time $T_9$, wave $E_2$ relinquishes control over line 202, thereby erasing the record of W in line 202, which record is no longer needed since line 204 continues to oscillate in phase W. Line 200 continues to oscillate in phase X. At time $T_{10}$, wave $E_2$ causes phase X to be copied in line 202 from line 200.

At time $T_{11}$, wave $E_3$ relinquishes control over line 200, thereby erasing the record of X in line 200. Now W is recorded in line 204 and X in line 202. Line 200 is now free to receive new information, so that time $T_{12}$ an input wave of the phase represented by Y may be applied to input couplier 218 to set up oscillations of phase Y in line 200. Also at time $T_{12}$, wave $E_3$ sets up sustained oscillations in line 206 in the phase dictated by line 204. So it is now known that phase W is recorded in lines 204 and 206, that phase X is recorded in line 202 and that phase Y is recorded in line 200.

In this manner the phase information is passed from line segment to line segment. Each time one of the waves $E_1$, $E_2$, $E_3$ relinquishes control of a group of lines the information recorded in these lines is erased, but in each case it will be evident that the information has previously been duplicated in another line. Each control wave may control two or more lines simultaneously. Item Z may be inserted at the appropriate time as will be evident from the foregoing.

When the phase information W has been transmitted to the last line segment of the system, line 208 in FIG. 8, further transmission is blocked by switch 250. The information contained in line 208 may be taken out by way of output coupler 220 of 261 at any time before the time when wave $E_x$ loses control of line 206. Whether $E_x$ is actually $E_1$, $E_2$, or $E_3$ will be determined by the number of lines used in the system but in any case the record in line 208 remains intact during the part of the cycle when the wave $E_x$ is at level B. It will be noted that the number of items that the system can store simultaneously is less than the total number of line segments because of the need for duplicating information in adjacent lines so that the information may pass from line to line without being lost when the control wave relinquishes control of a line in which the given item is stored. Whether the information should be taken out through coupler 220 or coupler 261 may depend upon the total number of line segments used. In a binary system the phase in one or the other of the output couplers when a given item of phase information, e.g., W, is to be read out will be the same as the phase that was applied to the line 200 when the same item (W, in this example) was read in.

Figure 11:
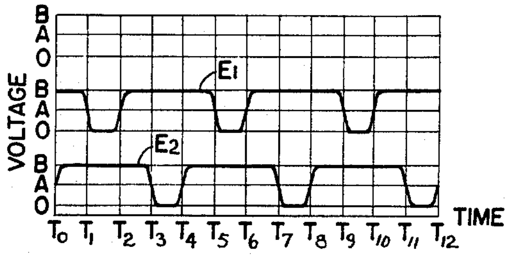

In the case of a three-phase control as shown in FIGS. 8 and 10, the storage capacity of the system is approximately two-thirds of the number of line segments. Four or more control waves may be used if desired. In the case of a four-phase control the storage capacity is approximately three-fourths the number of line segments; in the case of a five-phase control, approximately four-fifths, etc. Two-phase control, on the other hand, reduces the storage capacity to approximately one-half the number of line segments, but has an advantage in greater speed of operation. A system of control waves $E_1$ and $E_2$ for two-phase control is shown in FIG. 11.

In the operation of the system of FIG. 8 as a circulating memory system, delay line or the like, a closed loop arrangement of line segments is obtained by closing the switch 250 so that the coupler 230 is effective to transmit waves from line 208 to line 200. In this case, the number of like segments that may be used depends in part upon the number of phases in the control system. It will be evident that in the system of FIG. 8, the source 268 must be controlled by wave $E_1$ in order that the control may pass in regular order from $E_1$ to $E_3$, from $E_3$ to $E_2$, etc., all around the loop. This is equivalent to a requirement that the number of lines be a multiple of the number of control phases. In addition, it will be noted that in the system of FIG. 8, the coupling from one line segment to the next is of such character as to reverse the phase at each transfer. Therefore, if an item of phase information is to complete a full circuit of the loop and arrive at the beginning in the same phase as it started, an even number of line segments will be needed. However, if it is desired to use an odd number of line segments, it can be done by introducing a phase reversal in one of the connections between line segments, as, for example, by connecting output coupling 220 to the input side of unidirectional coupler 230 in place of the connection through switch 250.

Phase information may be fed into the loop by way of an input coupling to any desired line segment, input 218 being illustrative. With the same system of control waves as shown in FIG. 10, the operation is the same as in the case of the shift register up to the point where the system has been filled to capacity. With six line segments, for example, four items of phase information may be fed in. Now, instead of the item W, say, having to be read out of line 208 before the record of it is erased, the item will be passed along in due course to line 200, as will each succeeding item, and all four items may be kept circulating around the loop as long as it is desired to have them available. Successive items will appear in turn in the output coupler 220 with each item in its original phase. The inverses of the items will appear simultaneously in coupler 261 if that coupler is provided. Any particular item or its inverse will be found in the appropriate output coupling at a distinctive time in the control cycle. New items may be fed in at appropriate times in the cycle by means of an overriding wave of the frequency $f_1$ of the desired phase applied to the input coupling 218. Each new item introduced beyond the capacity of the system will cause the erasure of the old item which is about to be applied to line 200 from line 208.

Instead of synchronizing the system of FIG. 8 by varying the bias and thus controlling the tuning of the line segments, the excitation voltage may be varied in similar manner over a range of values including the critical value for initiating oscillations, and values above and below the critical value. The curves of FIG. 10 may then represent variations in the amplitude of the excitation wave—level O being below the critical amplitude for initiating oscillations, level A at the critical amplitude, and level B materially above the critical amplitude.

Instead of level O being a level below critical amplitude for initiating oscillations, level O may represent an excitation of reversed phase which tends to damp out oscillations. Instead of varying either the bias or the excitation, a component of frequency $f_1$ may be introduced in such pase as to damp out oscillations. Such a component is available in the line on the opposite side of the voltage node for frequency $f_1$.

In the system of FIG. 8, the typical unidirectional coupler 222, for example, may comprise a device such as an isolator, with linear capacitive coupling to the lines 200 and 202. An isolator comprising a ferrite gyrator contained in a wave guide of circular cross-section between two terminating wave guides of rectangular cross-section mechanically displaced through an angle of 45 degrees, is commercially available. The gyrator in this case provides a rotation of 45 degrees. A wave entering the isolator from the preferred direction receives a rotation of 45 degrees in the sense required to enable it to pass freely through the isolator. A wave entering the isolator from the opposite direction, however, receives a rotation of 45 degrees in the same sense as before and hence becomes polarized at an angle of 90 degrees with respect to the direction which would enable it to pass freely on and thus is substantially prevented from continuing.

Another type of unidirectional coupling which may be used between adjacent lines in the system of FIG. 8 is a diode, as illustrated in FIG. 9. In this figure, terminating diodes 232 and 234 at neighboring ends of two adjacent resonant lines are shown together with a third diode 236 coupled by linear capacitive couplings 235 and 237 to the adjacent resonant lines. If small signals are used the diode 236 may be at approximately zero bias. If larger signals are used, it may be desirable, for example, to connect a resistor in parallel with this diode. In this arrangement, the diode 236 serves to pass phase information substantially only from right to left. During the half cycle when the capacitance of diode 232 is larger than its mean value, the capacitance of diode 234 is smaller than its mean value. At the same time, the capacitance of the diode 236 is larger than its mean value. Hence, the coupling is greatest when the impedance on the right is less than the impedance on the left. Therefore, the phase on the left tends to conform with the phase on the right.

Figure 12:
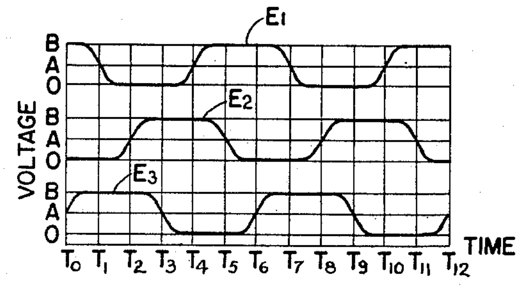

It is also possible to dispense with the unidirectional feature of the couplings 222, 224, 226, 228, 230 and substitute direct capacitive connections between the line segments which will transmit high frequency waves in either direction. In this case the control waves $E_1$, $E_2$, $E_3$ are altered so that when any one control wave is at a level to build up sustained oscillations in a given line, the adjacent line on one side is detuned or is oscillating at insufficient amplitude to exert control in the presence of a stronger wave. The adjacent line on the other side is at the same time oscillating strongly. The result is that transmission of phase information is possible substantially only from the strongly oscillating line to the line which is building up oscillations. The detuned or weakly oscillating line has substantially no effect upon the phase of its neighboring line. FIG. 12 shows control waves suitable for this mode of operation. However, with this arrangement the storage capacity is reduced to one-third of the number of line segments for a three-phase control system.

While the embodiments shown in FIGS. 1 through 8 are illustrated as having the excitation wave of frequency $f_2$ applied at a central point of the wave guiding structure, it is not necessary that the point of application be central. For example, one or more half wavelengths of line (for frequency $f_1$) may be added to the length of the line segment, in which case there will be one voltage node added for each added half wavelength. The excitation may be applied at any one or more of the nodes while retaining the advantage of minimizing the loading effect upon the resonant system at the frequency $f_1$. Should such loading be of negligible importance in a given case, the excitation may be applied at a point which is not a node at frequency $f_1$. Input and output couplings for either of the stable phases of frequency $f_1$ may be located wherever the desired phase of $f_1$ appears on the line.

It will be understood from the above description that when lengths for the line segment are used which cause the condition at its center not to be a node for the frequency component $f_1$, for example when the full length is three-quarters wavelength, the excitation should be off-centered, preferably at a node. It is usually desirable to use relatively short line segments.

The following will serve further to illustrate dimensions which are suitable, but it will be understood from the previous description that other dimensions may be employed in other instances.

In one unit, the resonant frequency is 1.5 kilomegacycles per second, which corresponds to a wavelength of 20 centimeters. The length of the resonator, measured from one of the capacitance elements to the other, is a quarter wavelength, that is, 5 centimeters. The excitation frequency $f_2$ is 3 kilomegacycles.

As another illustration, the apparatus may be designed for a resonant frequency of 10 kilomegacycles per second, which corresponds to a wavelength of 3 centimeters. The length of the resonator, measured between the capacitance elements, may be five quarters of a wavelength, that is, about 3.75 centimeters. The excitation frequency may be 20 kilomegacycles per second.

It will be understood from the above description that the non-linear resonant units described herein, and illustrated, for example, in FIGS. 1 through 4, may be employed in systems including one such unit or a plurality of them in combination. Thus certain combinations of units have been described in connection with FIGS. 6 through 9.

Thus the system of FIG. 8 involves a plurality of units of the type illustrated in FIGS. 1 and 2 connected in a serial or tandem relationship to each other. Various other arrangements of units such as parallel or series connection, or various combinations of parallel or series connections, may be used.

One of the important applications of units of the type described herein is to information handling systems. In such systems a plurality of units may have their outputs connected through a network for performing a logical operation, and the output of this network may be used as an input to another unit.

While an illustrative form of apparatus and a method in accordance with the invention have been described and shown herein, it will be understood that numerous changes may be made without departing from the general principles and scope of the invention.

What is claimed is:

1. In non-linear resonant apparatus, in combination, a wave supporting structure which is in itself materially off resonance for a given frequency $f_1$, non-linear reactance means at a fixed location in said structure and rendering the system comprising said structure and said non-linear means resonant in the neighborhood of said frequency $f_1$, said system having a nodal region for said frequency at a location in said structure distinct from the location of said non-linear means, exciting means impressed upon said system in said nodal region at a frequency $f_2$, said non-linear reactance means serving to regenerate a wave of said frequency $f_1$ in said system, and coupling means connected to the structure for accommodating oscillations of a resonant frequency of the system.

2. In non-linear resonant apparatus, in combination, two non-linear capacitance diodes with a transmission line segment providing an inductive reactance at a given frequency $f_1$ connected therebetween, said diodes effectively electrically terminating each end of said segment at said frequency $f_1$, the combination of said diodes and said line segment being resonant at said frequency $f_1$, and means operative at a second frequency for exciting oscillations in said line segment at said frequency $f_1$.

3. In non-linear resonant apparatus, in combination, a transmission line segment providing an inductive reactance at a given frequency $f_1$, two non-linear capacitance diodes, one connected to each end of the said line segment, said diodes effectively electrically terminating each end of said segment at said given frequency $f_1$, the combination of said diodes and said line segment being resonant at a frequency $f_1$, and means to impress waves upon said diodes at a frequency which is an integral multiple of $f_1$ to produce oscillations of said frequency $f_1$ in said line segment.

4. In non-linear resonant apparatus, in combination, a transmission line segment reactive at a given frequency $f_1$, non-linear reactance means coupled to said transmission line segment, said non-linear reactance means terminating at least one end of said transmission line segment, said transmission line segment and said non-linear reactance means together being resonant at the frequency $f_1$, and means operative at a second frequency $f_2$ for exciting oscillations in said transmission line segment at said frequency $f_1$, said oscillations of frequency $f_1$ having one of two opposite phase conditions, and pick-up means coupled to said transmission line segment for picking up oscillations of frequency $f_1$.

5. In non-linear resonant apparatus, in combination, a length of coaxial line providing an inductive reactance at a given frequency $f_1$, non-linear capacitance means serially included in the inner conductor of said line, said capacitance means effectively electrically terminating at least one end of said line at said given frequency $f_1$, to resonate the line at the frequency $f_1$, and means operative at another frequency for exciting oscillations in said line at the frequency $f_1$.

6. In non-linear resonant apparatus, in combination, a wave supporting structure, non-linear reactance means at a fixed location in said structure, the system comprising said structure and said non-linear means being resonant at a frequency $f_1$ and having a first nodal region for said frequency at a location in said structure distinct from the location of said non-linear means, exciting means operable upon said system in said nodal region at a frequency $f_2$, said system having a second nodal region effective for frequency $f_2$ at a location distinct from both the location of said non-linear means and the said first nodal region, by which arrangement impressed oscillations of frequency $f_2$ in the presence of initial oscillations of frequency $f_1$ tend to generate oscillations of a frequency $f_3$, and coupling means for oscillations of said frequency $f_3$ connected to said structure.

7. In non-linear resonant apparatus, in combination, a wave supporting structure, non-linear reactance means at a fixed location in said structure, the system comprising said structure and said non-linear means being resonant at a frequency $f$ and having a first nodal region for said frequency at a location in said structure distinct from the location of said non-linear means, exciting means impressed upon said system in said nodal region at the frequency $2f$, said system having a second nodal region for frequency $2f$, at a location distinct from both the location of said non-linear means and the said first nodal region, by which arrangement impressed oscillations of frequency $2f$ in the presence of initial oscillations of frequency $f$ of preferred phase tend to sustain said oscillations of frequency $f$, and coupling means for oscillations of frequency $f$ in the said second nodal region.

8. In an oscillator, a transmission line segment, a pair of non-linear reactance means, one coupled to said line segment at each end thereof, said line segment and said non-linear means together being resonant at a given frequency $f_1$, said resonant system having at least one voltage node between said ends, means to excite said non-linear means at a frequency $f_2$ which is an integral multiple of $f_1$, the amplitude of said exciting means being in excess of a threshold value requisite for exciting sustained oscillations of the system at said frequency $f_1$, and a pair of pick-up means coupled to the system on opposite sides of a voltage node thereof, whereby excitation at frequency $f_2$ produces two output waves of different phases at frequency $f_1$.

9. In an oscillator, in combination, a transmission line segment, a pair of non-linear reactance means, one coupled to one end of said line segment and one to the other end of said line segment, said line segment and said non-linear means together being resonant at a given frequency $f_1$ and causing a voltage node to exist at an intermediate point of said line segment, means effective at a frequency $f_2$ to excite said non-linear means, said frequency $f_2$ being an integral multiple of frequency $f_1$, the amplitude of said excitation being in excess of a threshold value requisite to sustain oscillations of the system at the frequency $f_1$, and pick-up means coupled to the system on one side of said voltage node, whereby excitation at frequency $f_2$ produces output waves of one of two opposite phases at frequency $f_1$ in said pick-up means.

10. Apparatus in accordance with claim 9, together with a second pick-up means coupled to the system on the opposite side of the voltage node from the first mentioned pick-up means, whereby two output waves of opposite phase are produced in the respective pick-up means.

11. Apparatus in accordance with claim 9, together with means coupled to the system on one side of the voltage node to impress upon the system a wave of frequency $f_1$ of a given phase, whereby the phases of the oscillations produced in the system are determined with reference to the phase of the said impressed wave.

12. In non-linear resonant apparatus, in combination, a coaxial transmission line segment reactive at a given frequency $f_1$, non-linear reactance means coupled to said line segment, said non-linear reactance means terminating at least one end of said line segment, and said line segment and said non-linear reactance means together being resonant at the frequency $f_1$, means to excite said non-linear reactance means at a frequency $f_2$ which is an integral multiple of $f_1$, the amplitude of excitation being less than the threshold value required to sustain oscillations of the system at said frequency $f_1$, and means to impress a wave of freqency $f_1$ upon said non-linear reactance means, whereby joint excitation at frequencies $f_1$ and $f_2$ produces an output wave at frequency $f_1$ coextensive in time with the duration of the joint excitation.

13. Apparatus in accordance with claim 12, in which the amplitude of excitation at frequency $f_2$ is less than the said threshold value but relatively close thereto, whereby a material degree of regenerative amplification is obtained in the otuput wave at frequency $f_1$ with reference to the impressed wave of the same frequency.

14. Apparatus in accordance with claim 12, in which the said means to impress a wave of frequency $f_1$ comprises a circulator, and an output wave at frequency $f_1$ is obtained by way of the circulator.

15. In an oscillator, in combination, a first line segment reactive at a given frequency $f_1$, first non-linear reactance means coupled to said line segment, said line segment and said non-linear reactance means together being resonant at the frequency $f_1$, means to excite said non-linear reactance means at a frequency $f_2$, a second line segment reactive at the frequency $f_3$, the relation of said frequencies being such that $f_3$ equals $f_2$ minus $f_1$, second non-linear reactance means coupled to said second line segment, said second line segment and said second non-linear reactance means together being resonant to said frequency $f_3$, means to excite said second non-linear means at the said frequency $f_2$, two-way coupling means between said respective line segments, and means to pick up from at least one of said line segments a wave of the frequency to which the segment is resonant.

16. Apparatus according to claim 15, together with means to impress upon at least one of said line segments a wave of the frequency to which the segment is resonant.

17. Apparatus according to claim 15 in which there is a common means for exciting both said first and second non-linear reactance means at frequency $f_2$.

18. In an oscillator, in combination, a first line segment reactive at a given frequency $f_1$, first non-linear reactance means coupled to said line segment, said line segment and said non-linear reactance means together being resonant at the frequency $f_1$, means to excite said non-linear reactance means at a frequency $f_2$, a second line segment reactive at the frequency $f_3$, the relation of said frequencies being such that $f_3$ equals $f_2$ minus $f_1$, second non-linear reactance means coupled to said second line segment, said second line segment and said second non-linear reactance means together being resonant to said frequency $f_3$, means to excite said second non-linear reactance means at the frequency $f_2$, two-way coupling means between said first and second line segments, and means to pick up from said first line segment a wave of frequency $f_1$ and from said second line segment a wave of frequency $f_3$.

19. In an oscillator, in combination, a first line segment reactive at a given frequency $f_1$, first non-linear reactance means coupled to said line segment, said line segment and said non-linear reactance means together being resonant at the frequency $f_1$, means to excite said non-linear reactance means at a frequency $f_2$, a second line segment reactive at the frequency $f_3$, the relation of said frequencies being such that $f_3$ equals $f_2$ minus $f_1$, second non-linear reactance means coupled to said second line segment, said second line segment and said second non-linear reactance means together being resonant to said frequency $f_3$, and a circulator having one terminal for an input coupling, a second terminal coupled to one of said line segments, and a third terminal for an output coupling.

20. In non-linear resonant apparatus, in combination, a two-conductor line segment reactive to a given frequency $f_1$, a plurality of non-linear reactive means connected in parallel with each other between the conductors of said line segment, and biasing means connected between the said conductors at a point intermediate a pair of said non-linear reactance means, for biasing a plurality of said non-linear reactance means by way of the said line conductors.

21. In a circulatory transmission device, in combination, a plurality of line segments each reactive at the same given frequency $f_1$, individual non-linear reactance means coupled to the respective line segments, each said line segment together with its coupled non-linear reactance means being resonant at said frequency $f_1$, means to excite each of said non-linear reactance means at a common frequency $f_2$ that is an integral multiple of $f_1$, a plurality of unidirectional couplers respectively connecting adjacent ones of said line segments in succession, input means for waves of frequency $f_1$ coupled to one of said line segments, and output means for waves of said frequency $f_1$ coupled to another of said line segments.

22. In non-linear resonant apparatus, in combination, a wave transmission line equivalent in length to at least an eighth of a wavelength at a frequency $f_1$ and differing in length from an integral number of quarter wavelengths at said frequency by a material amount, non-linear reactance means connected to said line at one end thereof, the system comprising said non-linear reactance means together with said line being resonant at said frequency $f_1$ and having a first nodal point for said frequency at a location in said line distinct from the point of connection of said non-linear reactance means, exciting means active at a second frequency higher than said frequency $f_1$ connected to said line at said first nodal point, the system comprising said non-linear reactance means together with said line having a second nodal point for said second frequency at a location distinct from both the said first nodal point and the point of connection of said non-linear reactance means, and coupling means for waves of said frequency $f_1$ connected to said line at said second nodal point.

23. In combination, a transmission line of the distributed impedance type, the length of said line being materially different from an integral multiple of a quarter wavelength at a frequency $f_1$, a non-linear reactive element positioned at one end of said transmission line and connected between the sides of said line, said reactive element being proportioned and adapted to build out the equivalent electrical length of the said line to an integral multiple of a quarter wavelength at the frequency $f_1$, and means coupled to said line at a nodal point thereof with respect to said frequency $f_1$, said last mentioned means being operative to impress upon said line waves of a frequency $f_2$ which is higher than said frequency $f_1$.

24. In non-linear resonant apparatus, in combination, two non-linear capacitance elements, a length of coaxial line connected therebetween, said line providing an inductive reactance at a given frequency $f_1$ and the combination of said non-linear elements and said line being resonant at said frequency $f_1$, said capacitance elements effectively electrically terminating each end of said line at said given frequency $f_1$, and means operative at a second frequency $f_2$ for exciting oscillations in said line at said frequency $f_1$.

25. In non-linear resonant apparatus, in combination, an extended segment of coaxial transmission line, a semiconductor diode, said diode being connected between the inner and outer conductors of said coaxial line at one end of said segment, the combination of said diode and said coaxial line segment being resonant at a first frequency, the said combination having a nodal region for said frequency at a central location along the length of said line segment, and means operative at a second frequency for exciting oscillations in said line segment at said first frequency, said exciting means being operative upon said line segment within said nodal region.

26. In non-linear resonant apparatus, in combination, an extended segment of coaxial transmission line having in at least one end thereof a semiconductor diode connected between the inner and outer conductors of the coaxial line, the combination so constituted being resonant at a first frequency, said combination having a nodal region for said first frequency at an intermediate location in said line remote from either end, and means operative at a second frequency for exciting oscillations in said line segment at said first frequency, said exciting means being coupled to said line segment at a location within said nodal region.

27. In non-linear resonant apparatus, in combination, an extended coaxial transmission line having in at least one end thereof a semiconductor diode connected between the inner and outer conductors of the said line, the combination so constituted being resonant at a first frequency, said combination having a first nodal region for said first frequency at an intermediate location in said line remote from either end, exciting means operative at a second frequency impressed upon said system in said first nodal region, said resonant combination having a second nodal region for said second frequency at a location distinct from both the location of said diode and the said first nodal region, by which arrangement impressed oscillations at the said second frequency in the presence of initial oscillations of preferred phase at the said first frequency tend to sustain said oscillations of said first frequency, said arrangement including coupling means for oscillations of said first frequency in said second nodal region.

28. In non-linear resonant apparatus for producing a wave of controlled phase, in combination, a wave supporting structure which is itself materially off resonance for a given frequency $f_1$, non-linear impedance means coupled to said structure, effectively electrically terminating the same near one end thereof, and rendering the system comprising said structure and said non-linear impedance means resonant at said frequency $f_1$, an output terminal coupled to said wave supporting structure, continuously operative excitation means connected to said structure and adapted to apply thereto continuous energizing oscillations at a substantially constant amplitude and at a constant frequency $f_2$ which is an integral multiple of $f_1$, whereby to establish in said structure and at said output terminal oscillatory waves including a component of frequency $f_1$, which is stable in one or the other of two opposite phase conditions, input means coupled to said structure for switching said component of frequency $f_1$ from one of said stable phase conditions to the opposite, said input means comprising means for applying to said structure an input wave, changed in phase from time to time, representing successive bits of binary information by one or the other of two opposite phases, said input wave being of sufficient amplitude to override waves of undesired phase in said structure, whereby different information bits cause said input wave to switch the phase of said wave at said output terminal from one stable phase to the opposite while said energizing oscillations of frequency $f_2$ are being continuously applied.

29. In combination, a line segment, non-linear impedance means coupled to said line segment, said line segment and said non-linear impedance means together being approximately resonant at a frequency $f_1$, excitation means continuously operative at a stable frequency $f_2$ connected to apply continuous oscillations of said frequency $f_2$ to said line segment, means for applying to said line segment an input wave representing bits of information by its phase, said input wave being of frequency $f_1$ such as to be a sub-harmonic of said wave of frequency $f_2$, and bias circuit means, including a dielectric member bearing a coating of resistive material, connected to apply a bias voltage through said line segment to said non-linear impedance means.

30. In non-linear resonant apparatus, in combinaiton, a line segment reactive at a given frequency $f_1$, non-linear reactance means coupled to said line segment near at least one end thereof, said line segment and said non-linear reactance means together being approximately resonant at the frequency $f_1$, means to apply to said line segment continuous oscillations of substantially constnat amplitude at a frequency $f_2$, whereby to establish in said line segment waves including a component of frequency $f_1$, means for applying to said line segment a wave of frequency $f_1$ of controlled phase and of an overriding amplitude great enough to control the phase of the waves of frequency $f_1$ existing in said line segment, and output means for sensing the phase of the waves of frequency $f_1$ existing in said line segment, said line segment including a first conductor and a second conductor, said non-linear reactance means comprising a diode, said apparatus also including bias voltage means, a coaxial cable coupled to said line segment and having inner and outer conductors connected respectively to terminals of said bias voltage means, and a dielectric rod bearing a coating of resistive material connected between one conductor of said line segment and one conductor of said cable, whereby to apply a bias voltage to said diode without short-circuiting said line segment for alternating waves.

31. In non-linear resonant apparatus, in combination, a line segment reactive at a given frequency $f_1$, non-linear reactance means coupled to said line segment near at least one end thereof, said line segment and said non-linear reactance means together being approximately resonant at the frequency $f_1$, means to apply to said line segment continuous oscillations of substantially constant amplitude at a frequency $f_2$, whereby to establish in said line segment waves including a component of frequency $f_1$, means for applying to said line segment a wave of frequency $f_1$ of controlled phase and of on overriding amplitude great enough to control the phase of the waves of frequency $f_1$ existing in said line segment, and output means for sensing the phase of the waves of frequency $f_1$ existing in said line segment, said line segment including a first conductor and a second conductor, said non-linear reactance means comprising at least one diode connected between said conductors, said apparatus also including means for applying a pulsed D.-C. bias voltage between said conductors and thereby to said diode.

32. In non-linear resonant apparatus, in combination, a line segment reactive at a given frequency $f_1$, non-linear reactance means coupled to said line segment near at least one end thereof, said line segment and said non-linear reactance means together being approximately resonant at the frequency $f_1$, means to apply to said line segment continuous oscillations of substantially constant amplitude at a frequency $f_2$, whereby to establish in said line segment waves including a component of frequency $f_1$, means for applying to said line segment a wave of frequency $f_1$ of controlled phase and of an overriding amplitude great enough to control the phase of the waves of frequency $f_1$ existing in said line segment, and output means for sensing the phase of the waves of frequency $f_1$ existing in said line segment, said non-linear reactance means comprising a diode, self-biasing means for said diode, said self-biasing means including a dielectric rod bearing on its surface a layer of resistive material, said layer being connected to provide a high resistance path between the conductors of said line segment, there being distributed capacitance between the conductors of said line segment, whereby said diode will, in response to the waves in said line segment, charge the said capacitance between the inner and outer conductors of said line segment while the resistance of said layer will govern the rate of discharge thereof, so as to provide amplitude stability in addition to phase stability in said apparatus.

33. In a non-linear resonant system including a non-linear reactance element, in combination, excitation means continuously operative at a given excitation frequency and connected to the non-linear resonant system, biasing means connected to said non-linear reactance element, control means for varying the biasing effect of said biasing means upon said non-linear reactance element to vary the reactance thereof and so to vary the resonant frequency of the non-linear resonant system, and a source of signal waves of a frequency materially different from the given excitation frequency connected to the non-linear resonant system for determining the phase of oscillations set up in the system when the said control means is operated to render the non-linear resonant system at least approximately resonant to the frequency of the waves from said source of signal waves.

34. Apparatus according to claim 33 in which the said source of signal waves is characterized by a frequency that is a submultiple of said given frequency of the excitation means.

35. In non-linear resonant apparatus, in combination, a plurality of interconnected non-linear resonant elements, individual biasing means for said non-linear resonant elements for determining in each element a tuned condition or an untuned condition relative to a given resonant frequency, continuously operative common excitation means for said non-linear resonant elements effective to set up oscillations in any said non-linear resonant element which is in the tuned condition, control means operative in a plurality of phases for varying said individual biasing means in rotation to pass each said non-linear resonant element through a cycle of alternations including a condition of substantially full resonance and a detuned condition, the said cycles in the individual non-linear resonant elements differing in phase under the control of said control means.

36. Apparatus according to claim 35, including a source of input signal waves for at least one of said non-linear resonant elements, and in which the said cycle of alternations includes a condition intermediate between the fully resonant condition and the detuned condition, and in which intermediate condition the element is sufficiently close to resonance so that oscillations may start to build up and a wave from said signal input source is effective to determine the phase of oscillations set up in said non-linear resonant element when said element passes from said intermediate condition into said fully resonant condition.

37. In combination, non-linear resonant means including wave supporting means and a non-linear impedance device coupled thereto, biasing means for applying a variable bias to said non-linear impedance device for varying the condition of said non-linear resonant means as between a tuned condition and an untuned condition relative to a give resonant frequency, a signal input source coupled to said non-linear resonant means, continuously operative excitation means for applying to said non-linear resonant means continuous oscillations of magnitude great enough to establish oscillations therein when in its said tuned condition, control means for varying said biasing means to pass said non-linear resonant means through a cycle including a detuned condition, a condition of substantially full resonance, and an intermediate condition between the fully resonant condition and the detuned condition, in which said non-linear means is sufficiently close to resonance so that oscillations may start to build up and a wave from said signal input source is effective to determine the phase of oscillations set up when said non-linear resonant means passes from said intermediate condition into said fully resonant condition.

References Cited in the file of this patent

UNITED STATES PATENTS

| | | |
|---|---|---|
| Re. 20,189 | Roosenstein | Dec. 1, 1936 |
| 2,191,315 | Guanella | Feb. 20, 1940 |
| 2,253,589 | Southworth | Aug. 26, 1941 |
| 2,526,207 | Donley et al. | Oct. 17, 1950 |
| 2,788,446 | Cerveny et al. | Apr. 9, 1957 |
| 2,811,647 | Nilssen | Oct. 29, 1957 |
| 2,815,488 | Von Neumann | Dec. 3, 1957 |
| 2,838,687 | Clary | June 10, 1958 |
| 2,909,654 | Bloembergen | Oct. 20, 1959 |
| 2,948,818 | Goto | Aug. 9, 1960 |

FOREIGN PATENTS

| | | |
|---|---|---|
| 778,883 | Great Britain | July 10, 1957 |

OTHER REFERENCES

Physical Review, July 1, 1957, vol. 107, No. 1, page 317, "A Solid State Microwave Amplifier and Oscillator Using Ferrites," Weiss.

Proc. I.R.E., April 1958, pages 700–706, "A Traveling-Wave Ferromagnetic Amplifier," Tien et al.

Electronics, March 1954, pages 184–186, "Electronically Tuned Wide-Range Oscillator," King et al.

UNITED STATES PATENT OFFICE

CERTIFICATE OF CORRECTION

Patent No. 3,175,164 March 23, 1965

Kenneth E. Schreiner

It is hereby certified that error appears in the above numbered patent requiring correction and that the said Letters Patent should read as corrected below.

Column 7, line 29, for "capacitance" read -- capacitive --; column 9, line 7, strike out "a"; line 19, strike out "line", first occurrence; same column 9, line 26, after "FIG. 6" insert a comma; column 11, line 7, for "stables" read -- stable --; line 38, after "is", first occurrence, insert a comma; line 46, for "deturning" read -- detuning --; same column 11, line 50, for "Dut" read -- Due --; column 12, line 23, for "that" read -- at --; line 44, for "of", second occurrence, read -- or --; column 13, lines 58 and 59, for "ampliture" read -- amplitude --; line 65, for "pase" read -- phase --; column 20, line 32, for "constnat" read -- constant --; column 21, line 46, after "each" insert -- said --.

Signed and sealed this 2nd day of November 1965.

(SEAL)
Attest:

ERNEST W. SWIDER
Attesting Officer

EDWARD J. BRENNER
Commissioner of Patents